(12) United States Patent
Selby

(10) Patent No.: US 6,732,333 B2
(45) Date of Patent: May 4, 2004

(54) SYSTEM AND METHOD FOR MANAGING STATISTICAL DATA REGARDING CORRECTIONS TO WORD PROCESSING DOCUMENTS

(76) Inventor: Scott Selby, 320 E. 23rd St., Apartment # 4K, New York, NY (US) 10010

( * ) Notice: Subject to any disclaimer, the term of this patent is extended or adjusted under 35 U.S.C. 154(b) by 685 days.

(21) Appl. No.: 09/760,562

(22) Filed: Jan. 16, 2001

(65) Prior Publication Data
US 2002/0095448 A1 Jul. 18, 2002

(51) Int. Cl.$^7$ .............................................. G06F 17/21
(52) U.S. Cl. ....................................................... 715/533
(58) Field of Search ................................. 715/533, 530, 715/531; 707/2; 703/22

(56) References Cited

U.S. PATENT DOCUMENTS

| | | |
|---|---|---|
| 4,913,566 A | 4/1990 | Sakai et al. |
| 5,189,610 A | 2/1993 | Kaplan et al. |
| 5,380,105 A | 1/1995 | Shimada et al. |
| 5,437,036 A | 7/1995 | Stamps et al. |
| 5,572,423 A * | 11/1996 | Church ........................ 715/533 |
| 5,604,897 A * | 2/1997 | Travis .......................... 715/533 |
| 5,682,543 A | 10/1997 | Shiomi |
| 5,761,689 A | 6/1998 | Rayson et al. |
| 5,787,451 A | 7/1998 | Mogilevsky |
| 5,875,443 A * | 2/1999 | Nielsen .......................... 707/2 |
| 5,889,518 A | 3/1999 | Poreh et al. |
| 5,903,269 A | 5/1999 | Poreh et al. |
| 5,924,059 A | 7/1999 | Kawanabe |
| 5,956,739 A * | 9/1999 | Golding et al. .............. 715/533 |
| 6,012,075 A | 1/2000 | Fein et al. |
| 6,040,832 A | 3/2000 | Poreh et al. |
| 6,047,300 A * | 4/2000 | Walfish et al. .............. 715/533 |
| 6,085,206 A | 7/2000 | Domini et al. |
| 6,618,697 B1 * | 9/2003 | Kantrowitz et al. .......... 703/22 |

OTHER PUBLICATIONS

Camarda, Special Edition Using Microsoft Word 2000, Que Corporation (1999), pp. 210–212.*

* cited by examiner

*Primary Examiner*—Stephen S. Hong
*Assistant Examiner*—Doug Hutton

(57) ABSTRACT

A method of analyzing data comprises the steps of collecting predefined data from at least one word processing program, the data including information concerning mistakes included in text, storing the data in a statistical database and analyzing the data to generate a report.

Software for tracking user errors comprises an interface module for interfacing with a word processing program, a data gathering module gathering data from the word processing program regarding user errors found in text and a data analysis module analyzing the data gathered and generating a report based thereon.

12 Claims, 3 Drawing Sheets

SYSTEM AND METHOD FOR MANAGING STATISTICAL DATA REGARDING CORRECTIONS TO WORD PROCESSING DOCUMENTS

FIELD OF THE INVENTION

The present invention relates to electronic word processing systems and, in particular, to systems and methods improving a user's spelling and grammar.

BACKGROUND INFORMATION

Conventional word processing programs often include correction subroutines which allow users to correct spelling, grammar, style, etc. in text documents. Conventional spell checking and grammar checking subroutines simply locate and assist the user in correcting perceived errors.

For example, to check the spelling in a WordPerfect™ document, the user activates the SpellChecker which checks every word of the document. In particular, the SpellChecker compares each word of the document to a list of predefined words stored in the SpellChecker's dictionary. If a particular word is not found in the dictionary, the SpellChecker alerts the user and offers suggestions on how to correct this error. For example, the SpellChecker may show a list of words similar to the misspelled word. The user may also skip the word in question retaining the current spelling. The SpellChecker continues checking the document until the entire document has been checked and corrected.

SUMMARY OF THE INVENTION

The present invention is directed to a method of analyzing data comprising the steps of collecting predefined data from at least one word processing program, the data including information concerning mistakes included in text, storing the data in a statistical database and analyzing the data to generate a report.

The present invention is also directed to software for tracking user errors comprising an interface module for interfacing with a word processing program, a data gathering module gathering data from the word processing program regarding user errors found in text and a data analysis module analyzing the data gathered and generating a report based thereon.

DETAILED DESCRIPTION

Figure 1:
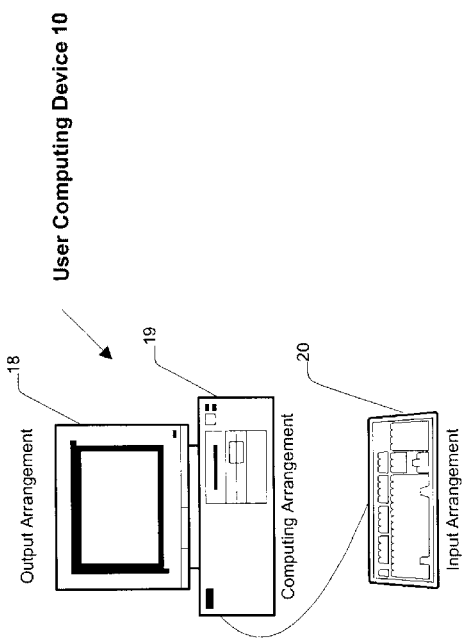
FIG. 1 shows an exemplary embodiment of a user computing device according to the present invention.

FIG. 1 shows a user computing device 10 which may be used in conjunction with the system and method according to the present invention. The user computing device 10 may, for example, be a personal computer, a network computer, a laptop, a personal digital assistant, a cell phone, a two-way pager, etc. and may include, e.g., a computing arrangement 19, an output arrangement 18 and an input arrangement 20. The output arrangement 18 may be a display monitor, a liquid crystal display, a printer, etc. The input arrangement 20 may be a keyboard, a mouse, a voice-recognition arrangement, a touch-sensitive screen, etc.

Figure 2:
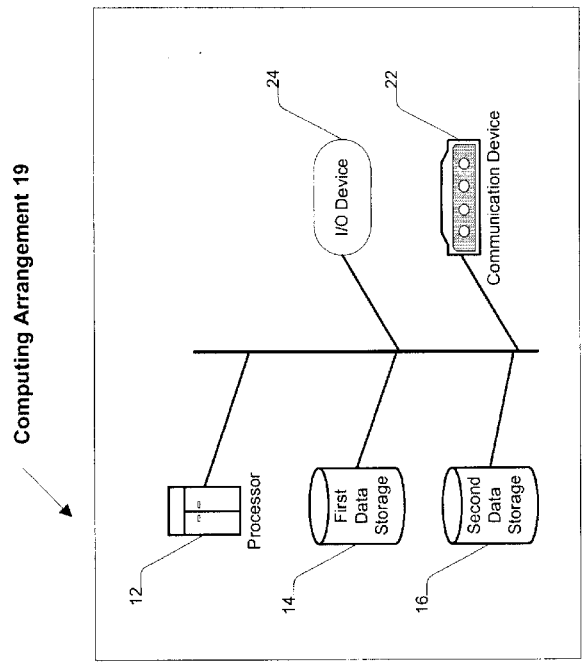
FIG. 2 illustrates a computing arrangement of the user device shown in FIG. 1.

Referring to FIG. 2, an exemplary embodiment of the computing arrangement 19 is shown including a processor 12, a first data storage 14 (e.g., a Random Access Memory), a second data storage 16 (e.g., a hard drive), a communication device 22 (e.g., a modem, a network interface card, etc.) and an Input/Output interface device 24 ("I/O device"). The communication device 22 allows the user device 10 to communicate with other computing devices. The I/O device 24 may provide, for example, input data and output data to and from the input arrangement 20 and the output arrangement 18, respectively.

Figure 3:
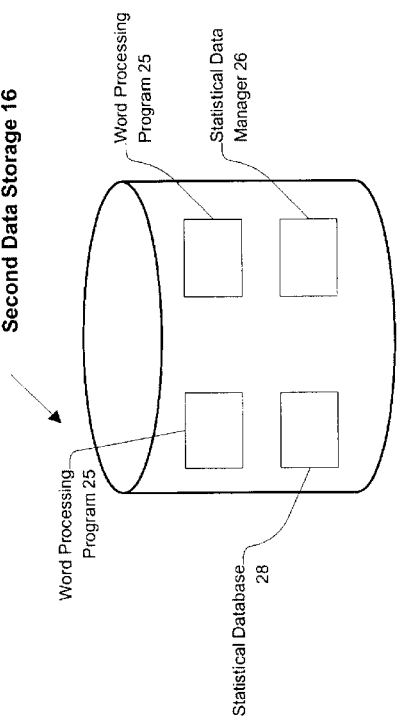
FIG. 3 shows a second data storage of the computing arrangement illustrated in FIG. 2.

The second data storage 16, as shown in FIG. 3, may store a plurality of software programs which may be executed by the processor 12. In particular, the second data storage 16 may store one or more word processing software programs 25, a statistical data manager ("SDM") 26 and a statistical database 28. The word processing programs 25 may include conventional document-generating programs (e.g., WordPerfect and MS Word) or any other programs capable of generating text and performing correction procedures (e.g., Outlook™, MS PowerPoint™, an HTML editor, etc.). The SDM 26 manages data regarding a user's corrections of documents and may work with a plurality of word processing programs 25. In particular, the SDM 26 may include a plug-in interface for each of the word processing programs 25 with which it is to operate. The statistical database 28 may store information regarding the user, the mistakes made and corrective actions performed during correction procedures. In an alternative exemplary embodiment, the SDM 26 may be combined with a word processing program 25 in a single program.

Figure 4:
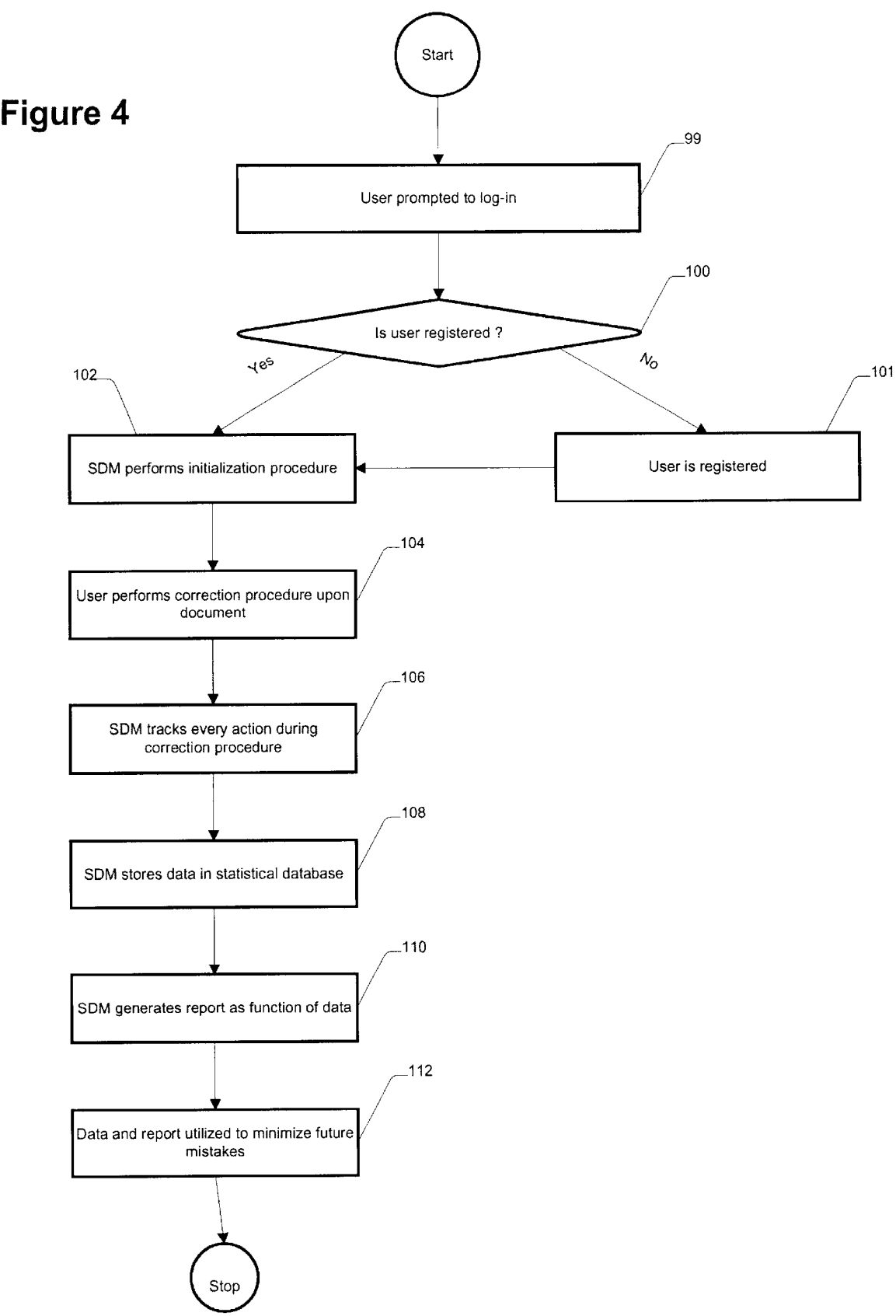
FIG. 4 illustrates an exemplary embodiment of a method according to the present invention.

FIG. 4 shows an exemplary embodiment of the method according to the present invention. Before the user starts utilizing one of the word processing programs 25, the user may be prompted to log-in (step 99) to the SDM 26. For example, a user may be required to enter an identification number ("user ID") and a corresponding password. If a user has not yet been assigned a user ID, the SDM 26 prompts a user to register. The SDM 26 determines whether the user is already registered by checking the identification number in the statistical database 28 (step 100). Of course, those skilled in the art will understand that the program may be operated without the log-in feature. For example, a user who has his own personal computer may completely eliminate this step and run this software when running word processing software 25 and, where a group of users share a computer, the mistakes of individual users who decide not to log-on may be included in a group database while others who do log-on may compile personalized data.

The user registers by providing identification information and preferences (step 101). In particular, the SDM 26 may obtain information (e.g., user's name) and associate this information with a user ID and password. The user's preferences may include a list of preferred word processing programs 25, a type of data to be tracked, a style of the report, etc. The user's identification and preference information is stored in the statistical database 28.

After the user has logged-in, the SDM 26 performs an initialization procedure (step 102). During the initialization procedure, the SDM 26 activates the plug-in extensions for the word processing programs 25 specified in the user's preferences allowing the collection of data from and/or the provision of data to each of the specified word processing programs 25.

In step 104, the user performs a correction procedure upon the document utilizing, e.g., a utility provided by the corresponding word processing program 25. Of course, those skilled in the art will understand that any number of utilities (e.g., spelling check, grammar check, etc.) provided by known word processing programs may be incorporated in the plug-in extensions to allow checking not enabled by the particular word processing programs. As described above, the correction procedure may include the checking of the spelling, grammar and style of the document. In addition, the user may utilize a quick correct function which allows to quickly correct mistakes previously defined by the user. For example, the user may decide that every time the spell checker finds the spelling "deser", it will change this word to "desert". Furthermore, the user may utilize a thesaurus to replace certain words with synonyms.

During the correction procedure, every action of the user is tracked by the SDM 26 (step 106). In particular, the SDM 26 tracks (a) "mistakes"—what needs to be corrected in the document (e.g., a particular misspelled word) and (b) "corrective actions"—actions needed to correct the mistakes (e.g., replace the misspelled word with a correctly spelled word). For example, if the document originally included the spelling "deser", the SDM 26 will track this word as a mistake. In addition, the SDM 26 tracks the replacement of the word "deser" with the word "desert" as a corrective action.

In addition to mistakes and corrective actions, the SDM 26 may track other information, such as a date and time of mistakes and the corresponding corrective actions; a type of world processing program 25 used, a portion of the document in which mistakes were made, a total number of mistakes, etc.

In step 108, the SDM 26 stores the data in the statistical database 28. The statistical database 28 may include a plurality of records, each containing information about a particular mistake, a corresponding corrective action and related information (e.g., date, time, type of mistake, type of the word processing program 25, etc). The information stored in each record may vary from user to user. The statistical database 28 may be updated in real-time or at predetermined time intervals.

After the data has been stored in the statistical database 28, the SDM 26 may analyze the data to generate a report (step 110). The report may include, e.g., information on the various mistakes made, the corrective actions taken and any correlation between the mistakes and the corresponding corrective actions. The reports may be generated for particular users, for selected portions of a particular document, for particular word processing programs 25, for a predetermined time frame, etc. A graph representing a number of mistakes made over a predefined time period may be included into the report as well as statistical analysis of the frequency of particular mistakes. For example, if the same word is misspelled 10 times, a user may be given this total as well as the information that 8 times the word was misspelled in a first way, while a second misspelling of this word was found twice. This allows the user to see the frequency with which he makes particular mistakes and to take action to prevent recurrence of the more frequent mistakes.

As described above, the data and report may be utilized to minimize mistakes in the future (step 112). One way to minimize future mistakes is to educate users concerning the mistakes they are currently making. In particular, the SDM 26 may analyze data regarding a user's mistakes and corrective actions to generate a detailed report. Analyzing the corrective actions, the SDM 26 may suggest other corrective actions as an alternative or in addition to the actions taken by the user. When analyzing the mistakes, the SDM 26 may generate a report indicating a pattern of mistakes and their frequency common to the user. For example, if the user is consistently making the same mistake, the user may not be familiar with a corresponding spelling rule. The user may be provided with this spelling rule and related illustrative examples of this rule. Subsequently, the user may be tested on applicability of the rule. The SDM 26 may continuously track these mistakes and show any change in frequency of the mistake after the frequency of the error was pointed out and assistance in correcting the error was provided.

Another way to minimize future mistakes is to adjust the word processing program 25 based on the data tracked and recorded by the SDM 26. For example, the SDM 26 may determine (based on, for example, corrective actions taken) that the user frequently types the word "desert" without adding the 't'. The SDM 26 may then "alert" the spell checker of the word processing program 25 that the misspelled word "deser" is to be corrected by the word "desert". Thus, as soon as the user types "deser", an alert is issued and the user is asked to correct the word to "desert". Alternatively, the misspelled word "deser" may be automatically corrected to "desert" without interaction from the user. For example, the data tracked and recorded by the SDM 26 enables the spell checker of the word processing program 25 to correlate "deser" directly with "desert" instead of the user (or automatic corrector) having to choose between "denser", "desert", "deer", "dessert", "defer" and "deter". Alternatively, the spell checker of the word processing program 25 can make use of the data tracked and recorded by the SDM 26 to place "desert" at the top of the list of suggested replacements for "deser" for a user who frequently makes this mistake. A user who frequently mistypes "deser" for another word (e.g., denser) will find this other word at the top of the suggested replacements for "deser".

The following is an illustrative example of the use of the method and system according to the present invention. For example, a high school student asked to write a paper on George Washington, first logs-in and types the paper using, for example, WordPerfect™ as his word processing program 25. After the paper has been typed (or partially typed), the student may perform a correction procedure by activating the SpellChecker to find mistakes in the paper. While the SpellChecker is correcting mistakes, the SDM 26 collects and tracks data to be stored in the statistical database 28. The data is analyzed and, upon the student's request, the SDM 26 provides the student with a report. The report may list mistakes made by the student along with the corrective actions taken by the student. The report may also include suggestions on means to minimize these mistakes in the future. Of course, this system is equally useful in a wide variety of situations including, for example, corporate training in word processing, etc. Furthermore, the report may organize the data in a variety of ways including, but not limited to: 1) by order of frequency of a particular mistake (e.g., if 'deser' instead of "desert" is the most frequent error, this would appear first); 2) the frequency of the underlying word which is misspelled (i.e., if a first word is misspelled two different ways with a total of these two misspellings being greater than the total misspellings of any other word, this first word will appear first); alphabetically, chronologically, by frequency of corrective action taken, etc.

Figure 5:
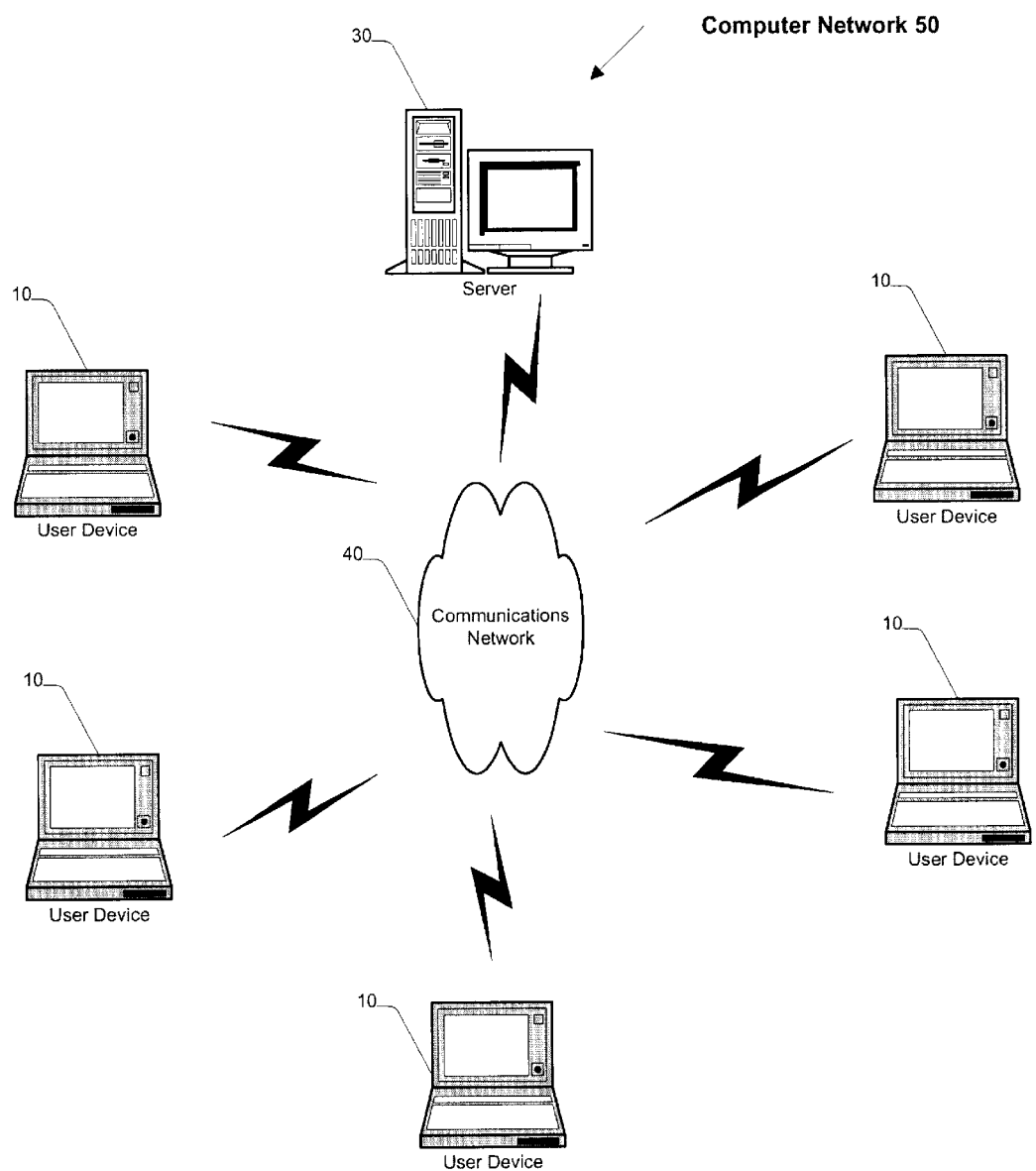
FIG. 5 shows an exemplary computer network utilizing the present invention.

FIG. 5 shows an exemplary computer network 50 utilizing the present invention. The computer network 50 may include a plurality of user devices 10 and a server 30 in communication with each other via a communications network 40 (e.g., a local area network, a wide area network, an intranet, the Internet, etc.). As described above, each of the user devices 10 may include at least one word processing program 25; alternatively, one or more word processing programs 25 may be stored in the server 30 for remote access by the user devices 10. Similarly, the SDM 26 and the statistical database 28 may be stored in either the server 30 or in one or more of the user devices 10.

The computer network 50 may be utilized, for example, in a school setting with a teacher and students using the computer network 50. Each time a student logs-in and uses a word processing program 25, the data for this student may be collected by the SDM 26 regardless of the particular one of the user devices 10 on which the student is working. This data is then stored in the statistical database 28 located in the server 30.

The teacher may then utilize the system and method according to the present invention to determine, e.g., which mistakes are most commonly made by the students or by a particular student, a level of knowledge of the students or particular students, a proper level of difficulty for future examinations, etc. and to identify problem areas on which to work. The SDM 26 may track the data whether the student utilizes a user device 10 from the school or from home or any other location. The SDM 26 may then generate a comprehensive data report and analyze it to determine the student's or students' progress over a period of time.

According to an alternative exemplary embodiment of the present invention, the SDM 26 and corresponding statistical database 28 may be portably stored and transferred by a user to any computing device capable of running a word processing program 25.

The present invention allows users to collect and analyze data on errors made over a period of time to improve spelling, grammar and other related skills. This data may also be used to generate, for example, examinations specifically testing problems and geared to a level of competence indicated by past performance. An additional use of this data would be to assist educational spelling software (such as spelling games software) in customizing a database of commonly misspelled words for individual users or groups of users based on their past performance. In addition, the system may collect data on a group of users so that, for any mistake made by the group above a predefined frequency or by more than a predetermined number of the users (e.g., 70%) results in an alert being sent to all users.

The present invention also allows users to personalize the collected data and to collect this data from any of a plurality of word processing programs 25. For example, data collected from WordPerfect™ and MS Word™ may be utilized to influence corrections made in MS Outlook™ and vice-versa. Thus, the present invention allows a user to learn more completely about his shortcomings and correct these so that future mistakes are minimized. Although the examples given refer to spelling errors, those skilled in the art will recognize that the same software and methods will be equally applicable to the correction of grammar errors or errors in style by interacting with the software which corrects these errors to collect and analyze the same data tracked and recorded by the SDM 26 in regard to spelling errors.

In the preceding specification, the present invention has been described with reference to specific exemplary embodiments. However, it will be evident to those skilled in the art that various modifications and changes may be made thereto without departing from the broad spirit and scope of the present invention which is intended to be limited only by the claims that follow. The specification and drawings are accordingly to be regarded in an illustrative rather than a restrictive sense.

What is claimed is:

1. A method of analyzing data, comprising the steps of:
    collecting predefined data from at least one word processing program, the data including information concerning mistakes included in text;
    storing the data in a statistical database;
    analyzing the data to generate a report; and
    providing an option to organize the report by order of the frequency of misspelling a particular word and by order of the frequency of a particular spelling mistake of a particular word,
wherein the predefined data is collected on each of a plurality of mistakes and wherein the report includes an indication of the frequency of the mistakes made and change in frequency over time for the mistakes made.

2. The method according to claim 1, wherein the predefined data is collected from a plurality of word processing programs.

3. The method according to claim 1, wherein the predefined data is gathered from a plurality of users with the predefined data being sorted by user.

4. The method according to claim 1, wherein the mistakes include grammar mistakes and spelling mistakes.

5. The method according to claim 1, wherein the data collected corresponds to corrective actions taken in response to the mistakes.

6. A computer program embodied on a computer-readable medium having computer-executable instructions for carrying out a method to analyze data, the method comprising the steps of:
    collecting predefined data from at least one word processing program, the data including information concerning mistakes included in text;
    storing the data in a statistical database;
    analyzing the data to generate a report; and
    providing an option to organize the report by order of the frequency of misspelling a particular word and by order of the frequency of a particular spelling mistake of a particular word and by order of the frequency of grammar mistakes,
wherein the predefined data is collected on each of a plurality of mistakes and wherein the report includes an indication of the frequency of the mistakes made and a change in frequency over time for the mistakes made.

7. The computer program according to claim 6, wherein the predefined data is collected from a plurality of word processing programs.

8. The computer program according to claim 6, wherein the predefined data is collected from a plurality of users.

9. The computer program according to claim 7, wherein the plurality of word processing programs run on a plurality of devices that communicate via a communications network.

10. The computer program according to claim 6, the method further comprising the step of:
    altering the operation of the at least one word processing program based on the data analysis.

11. The computer program according to claim 6, the method further comprising the step of:
    providing to a user generalized mistake correction instructions based on the data analysis.

12. The computer program according to claim 6, wherein the data collected corresponds to corrective actions taken in response to the mistakes.

* * * * *